United States Patent [19]

Barbosa

[11] Patent Number: 4,771,822
[45] Date of Patent: Sep. 20, 1988

[54] AUTOMOBILE TIRE, RADIATOR AND BRAKE COOLING SYSTEM WITH PASSENGER COMPARTMENT WATER HEATER

[76] Inventor: Ricardo A. Barbosa, 327 Brevnig Ave., Trenton, N.J. 08638

[21] Appl. No.: 50,078

[22] Filed: May 15, 1987

[51] Int. Cl.⁴ .......................... F01P 9/00; B60C 23/18; F16D 65/78; F24B 1/00
[52] U.S. Cl. ........................................ 165/41; 165/51; 123/41.01; 182/153; 188/71.6; 188/264 E; 126/19.5; 222/146.2; 222/146.5; 222/610; 222/626
[58] Field of Search ................. 165/41, 51; 123/41.01; 152/153; 188/71.6, 264 E; 126/19.5; 222/146.2, 146.5, 608, 610, 626, 628; 237/12.3 R; 239/284.1, 289, 280, 129

[56] References Cited

U.S. PATENT DOCUMENTS

| | | | |
|---|---|---|---|
| 2,388,114 | 10/1945 | Boyce | 188/264 E |
| 2,481,135 | 9/1949 | Maness, Jr. et al. | 123/41.01 |
| 2,800,776 | 7/1957 | Woodmansee . | |
| 2,821,437 | 1/1958 | Lesher | 188/264 E |
| 2,894,265 | 7/1959 | Reardon | 165/51 |
| 2,933,337 | 4/1960 | Katz . | |
| 2,958,399 | 11/1960 | Osborne . | |
| 2,975,797 | 3/1961 | Matheney . | |
| 3,148,675 | 9/1964 | Menuto | 165/51 |
| 3,224,218 | 12/1965 | New . | |
| 3,558,013 | 1/1971 | Ponzo | 222/146.2 |
| 3,590,960 | 7/1971 | Reynolds . | |
| 3,769,947 | 11/1973 | Crain | 123/41.01 |
| 4,140,150 | 2/1979 | Rundell . | |
| 4,274,390 | 6/1981 | Azuma | 126/19.5 |
| 4,384,512 | 5/1983 | Keith . | |
| 4,575,003 | 3/1986 | Linker et al. | 165/41 |
| 4,694,891 | 9/1987 | Okumura et al. | 165/41 |

FOREIGN PATENT DOCUMENTS

| | | | |
|---|---|---|---|
| 2458202 | 6/1976 | Fed. Rep. of Germany | 188/264 E |
| 454102 | 9/1936 | United Kingdom | 188/264 E |
| 857305 | 12/1960 | United Kingdom | 126/19.5 |
| 1417467 | 12/1975 | United Kingdom | 126/19.5 |
| 2152012 | 7/1985 | United Kingdom | 222/146.2 |

Primary Examiner—Albert W. Davis, Jr.
Assistant Examiner—John K. Ford
Attorney, Agent, or Firm—R. Martin Oliveras

[57] ABSTRACT

An automobile tire and brake cooling system using water to effect cooling comprises: a water tank located in the trunk; first valve control means located in the passenger compartment for actuating first water control valve means associated with the tank; first conduit means for directing water from the first water control valve means to water spray ejection means located adjacent to the front upper quadrants of the front and rear tire surfaces; second conduit means for directing water from the first water control valve means to water stream ejection means located adjacent to the brake housings of the front and rear wheels; third conduit means for directing water from the first conduit means to water spray ejection means located in front of the radiator; second valve actuating front located second water control valve means associated with the second conduit means; fourth conduit means for directing water from the second water control valve means to front located preheating means associated with the engine exhaust manifold; fifth conduit means for directing water from the preheating means to front located electrical heating means; sixth conduit means for directing hot water from the electrical heating means to the passenger compartment; and seventh conduit means for directing cold water from the second water control valve means to the passenger compartment. The brake housings receive a stream of water while the tire surfaces and the front radiator surface receive an atomized spray of water.

6 Claims, 4 Drawing Sheets

AUTOMOBILE TIRE, RADIATOR AND BRAKE COOLING SYSTEM WITH PASSENGER COMPARTMENT WATER HEATER

FIELD OF THE PRESENT INVENTION

This invention relates to automobile cooling systems and in particular to such a unitary system which effects cooling of the automobile tires and brakes utilizing water.

DISCUSSION OF THE PRIOR ART

The prior art reveals several automobile cooling systems as follows:

a. Woodmansee U.S. Pat. No. 2,800,776 entitled "Water Cooler Attachment" discloses such an attachment comprising a water container, a lid, a cooling coil, notch-like openings, an inlet duct, an outlet duct, first and second T-fittings, and flow controlling means including an inlet valve, an outlet valve, and a shut-off valve;

b. Katz U.S. Pat. No. 2,933,337 entitled "Anti-Skid Implement For Automobiles" discloses such an implement comprising panels, container securing means, atomizing means, and atomizer actuating means;

c. Osborne U.S. Pat. No. 2,958,399 entitled "System for Cooling Kinetic-Energy Absorbing Devices" discloses a system for cooling brakes comprising a liquid reservoir, liquid coolant replenishing means, conduit means, coolant forcing means, a brake carrier, and a reaction plate including a plurality of hollow stator keys and a plurality of atomizers;

d. Matheney U.S. Pat. No. 2,975,797 entitled "Water Supply for Motor Cars" discloses such a supply comprising a pair of tanks, a conduit, a two-way dispensing valve, a pair of branches, a mixing valve, and an outlet conduit;

e. New U.S. Pat. No. 3,224,218 entitled "Air Cooling And Liquid Supply Systems for Automobiles" discloses such a system comprising a casing, a liquid tank, filler caps, liquid conveying means, a cooling container, liquid cooling and conveying means, a duct system, first and second air forcing means, and tray means;

f. Reynolds U.S. Pat. No. 3,590,960 entitled "Brake Fluid Cooling Arrangement" discloses such an arrangement comprising cooling fluid inlets and cooling fluid outlets for the two front wheels brakes, a first cooling fluid pump, cooling fluid containing and cooling fluid cooling means, and cooling fluid conduit means;

g. Rundell U.S. Pat. No. 4,140,150 entitled "Drinking Water Supply and Conditioner for Vehicles" discloses such means comprising a tank, first and second heat exchangers, a liquid dispensing and mixing faucet, conduit means, and drinking water conveying means; and h. Keith U.S. Pat. No. 4,384,512 entitled "Beverage Heater And Cooler" discloses such means comprising a console, a recessed chamber, a plurality of spigots, a drain chamber, a thermoelectric module, heat insulating means, a ventilating chamber, and a fan.

From such review, it appears that the cited prior art patents do not disclose the unitary tire and brake cooling system utilizing water of the present invention.

Objects of the present invention are therefore to provide such a unitary system that:

a. allows for the cooling of the automobile tires while the vehicle is in motion;

b. allows for the cooling of the automobile brakes while the vehicle is in motion;

c. allows for the cooling of the automobile radiator while the vehicle is in motion; and d. provides both hot and cold water to the passenger compartment.

SUMMARY AND FEATURES OF THE PRESENT INVENTION

A summary and features of the present invention are that:

a. an automobile tire and brake cooling system using water to effect cooling comprises: a water tank located in the trunk; first valve control means located in the passenger compartment for actuating first water control valve means associated with the tank; first conduit means for directing water from such first water control valve means to water spray ejection means located adjacent to the front upper quadrants of the front and rear tire surfaces; second conduit means for directing water from such first water control valve means to water stream ejection means located adjacent to the brake housings of the front and rear wheels; third conduit means for directing water from such first conduit means to water spray ejection means located in front of the radiator; second valve control means located in the passanger compartment for actuating front located second water control valve means associated with such second conduit means; fourth conduit means for directing water from such second water control valve means to front located preheating means associated with the engine exhaust manifold; fifth conduit means for directing water from such preheating means to front located electrical heating means; sixth conduit means for directing hot water from such electrical heating means to the passenger compartment; and seventh conduit means for directing cold water from such second water control valve means to the passenger compartment; and b. the brake housings receive a stream of water while the tire surfaces and the front radiator surface receive an atomized spray of water.

Advantages of the present invention are therefore that:

a. it is easy and economical to manufacture and to install; and b. it can be used intermittently or all the time as required.

DESCRIPTION OF THE DRAWING

The above and other objects, features, and advantages of the present invention will be better appreciated from a reading of the following detailed description in conjunction with the drawing in which.

DETAILED DESCRIPTION OF THE PRESENT INVENTION

Figure 1:
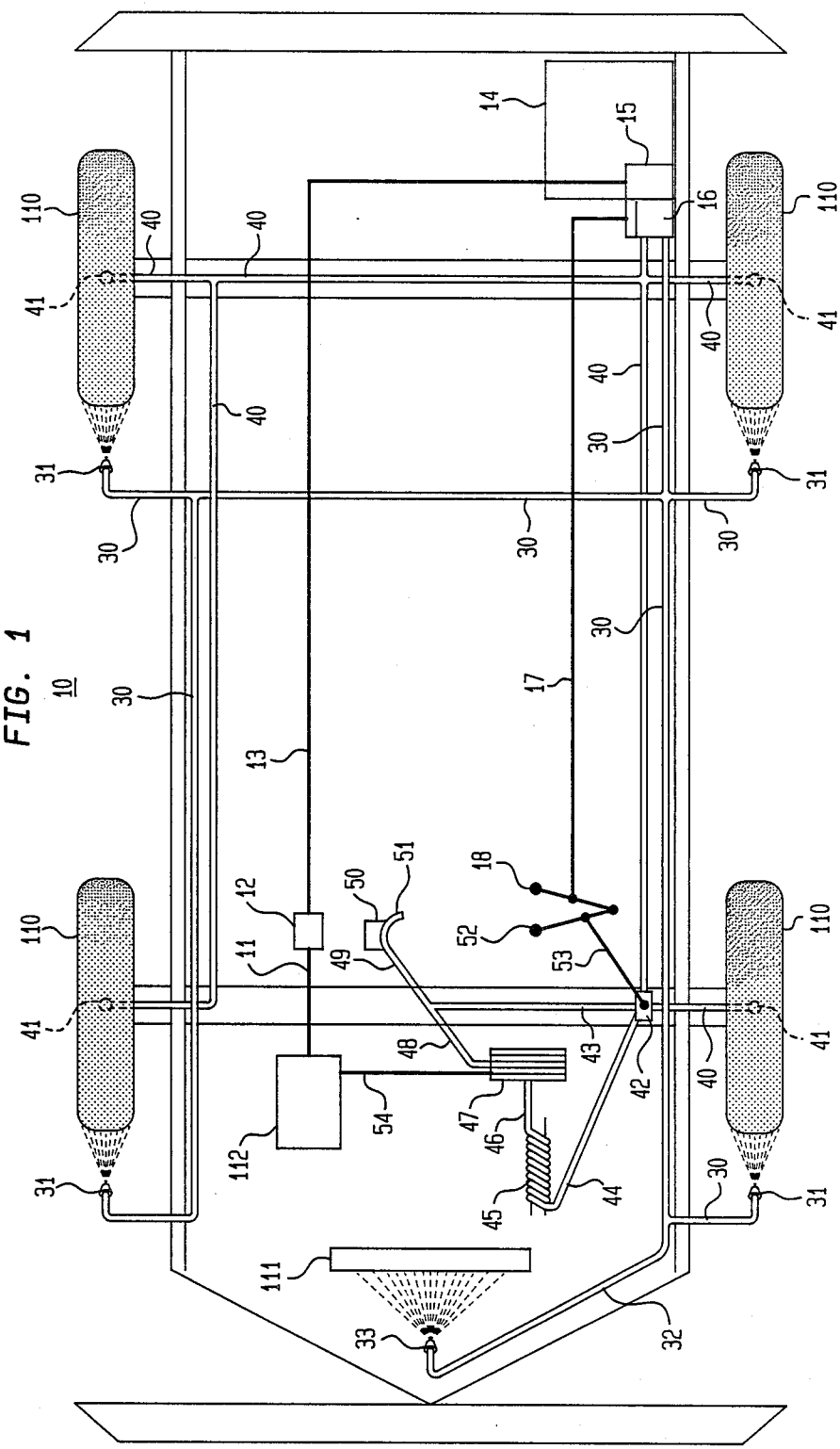
FIG. 1 is a partially cross-sectional top view of an automobile chassis showing the unitary tire and brake cooling system of the present invention.

FIG. 1 is a partially cross-sectional top view of an automobile chassis showing unitary tire and brake cooling system 10 of the present invention. FIG. 1 shows: tires 110; radiator 111; battery 112; electrical connecting means 11 for connecting battery 112 to passenger compartment located electrical switch 12; electrical connecting means 13 for connecting switch 12 to trunk located electrical pump 15; water tank 14 located in automobile trunk; rear located water control valve means 16 for controlling the output of water from tank 14 via pump 15 to conduit means 30 and 40; passenger compartment located valve control means 18 for controlling rear located water control valve means via connecting means 17; conduit means 30 for directing water from rear located water control valve means 16 to tire associated water spray ejection means 31; conduit means 32 for directing water from conduit means 30 to radiator associated water spray ejection means 33; conduit means 40 for directing water from rear located water control valve means 16 to brake housing associated water stream ejection means 41; front located water control valve means 42 for receiving water from conduit means 40; conduit means 44 for directing water from front located water control valve means 42 to preheating means 45 associated with the engine exhaust manifold; conduit means 46 for directing water from preheating means 45 to front located electrical heating means 47; electrical connecting means 54 for connecting battery 112 to electrical means 47; conduit means 48 for providing hot water from electrical heating means 47 to common conduit means 49; conduit means 43 for providing cold water from front located water control valve means 42 to common conduit means 49; passenger compartment located water control valve means 50 for providing hot or cold water from common circuit means 49 to the passenger compartment via output circuit means 51; and passenger compartment located valve control means 52 for controlling front located water control valve means 42 via connecting means 53.

Figure 2:
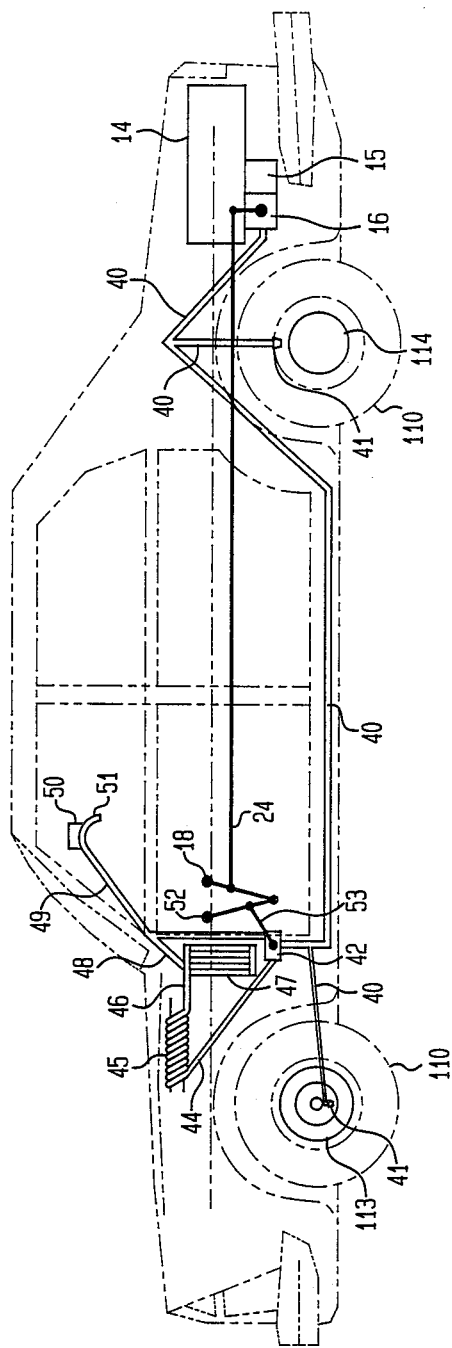
FIG. 2 is a partially cross-sectional side view of an automobile chassis showing the brake housing cooling portion and the hot and cold water providing portion of the present invention.

FIG. 2 is a partially cross-sectional side view of an automobile chassis showing the brake housing cooling portion and the hot and cold water providing portion of system 10. FIG. 2 shows: tank 14; pump 15; rear located water control valve means 16; conduit means 40; water stream ejection means 41; tires 110; rear brake drum housing 114; front disc brake housing 113; connecting means 24; valve control means 18; valve control means 52; connecting means 53; front located water control valve means 42; conduit means 44; preheating means 45; conduit means 46; electrical heating means 47; conduit means 48; common conduit means 49; valve control means 50; and output conduit means 51.

Figure 3:
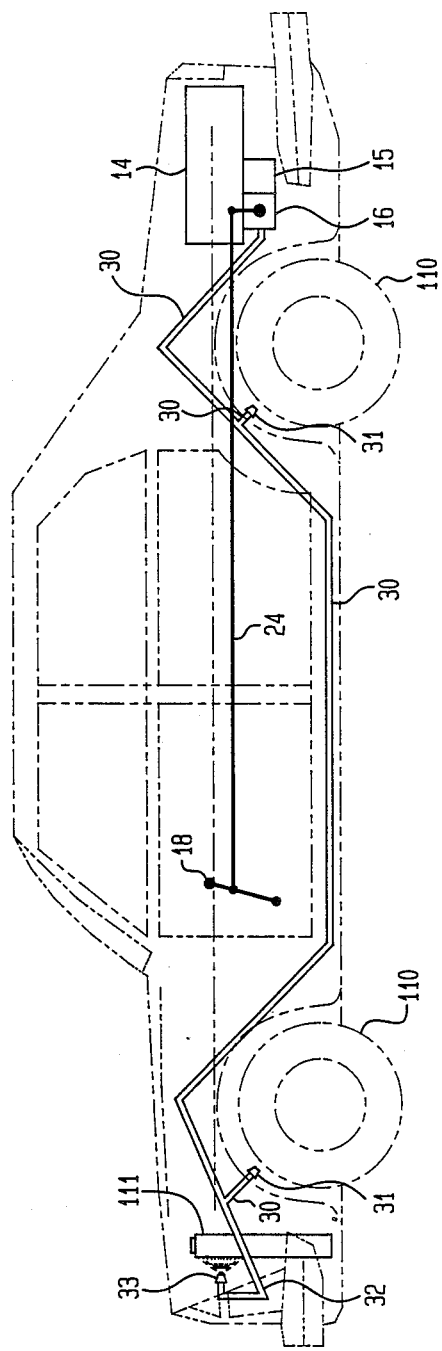
FIG. 3 is a partially cross-sectional side view of an automobile chassis showing the tire and radiator cooling portion of the present invention.

FIG. 3 is a partially cross-sectional side view of an automobile chassis showing the tire and radiator cooling portion of system 10. FIG. 3 shows: tank 14; pump 15; rear located water control valve means 16; conduit means 30; water spray ejection means 31; tires 110; connecting means 24; valve control means 18; conduit means 32; water spray ejection means 33; and radiator 111.

Figure 4B:
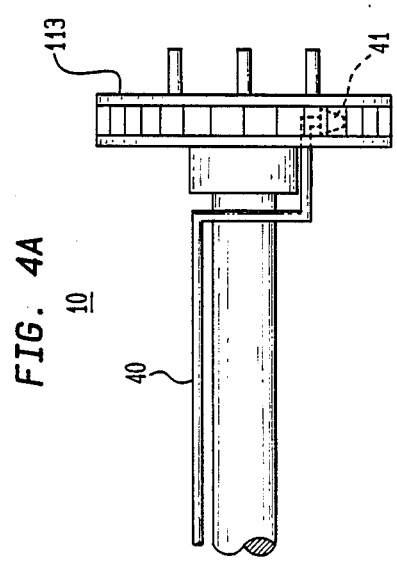
FIG. 4A is a front view of a disc brake housing and FIG. 4B is a front view of a drum brake housing showing the brake cooling portion of the present invention.
Figure 4A:
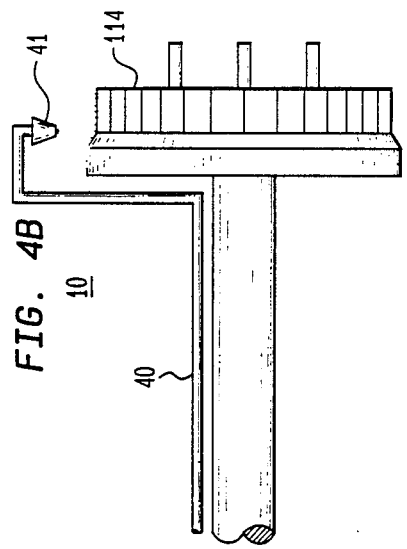

FIG. 4A is a front view of a disc brake housing and FIG. 4B is a front view of a drum brake housing showing the brake cooling portion of system 10. FIG. 4A shows: conduit means 40; water stream ejection means 41; and disc brake housing 113. Finally, FIG. 4B shows: conduit means 40; water stream ejection means 41; and drum brake housing 114.

Valve control means 18 and 52 may be mechanical means or electrical means as desired. Water stream ejection means 41 provide a stream of water to the associated brake housings. Water spray ejection means provide an atomized spray of water onto the front upper quadrant of each associated tire while water spray ejection means 33 provides such an automized spray of water onto the front of radiator 111. Tank 14 may have a capacity of about 10 to 20 gallons of water while rear located water control valve means 16 may further include associated water filter means. The brake cooling system is advantageously used on downhill grades while the tire and radiator cooling system is advantageously used in hot climates. The radiator cooling system is advantageously used to eliminate the need for water bags. It has been determined that the angle of water spray ejection means 31 should be perpendicular to the associated tire surface at a location on the tire surface being 45 degrees from the vertical on the front upper quadrant of each tire. It has been further determined that the size of the atomized droplets provided by water spray ejection means 31 and 33 should be about 50 to 100 microns in diameter. It has been further determined that the size of the water stream provided by water stream ejection means 41 should be about 1.5 millimeters in diameter.

While the arrangement according to the present invention has been described in terms of a specific illustrative embodiment, it will be apparent to those skilled in the art that many modifications are possible within the spirit and scope of the disclosed principle.

What is claimed is:

1. An automobile tire and brake cooling system using water to effect cooling comprises: a water tank located in the trunk; first valve control means located in the passenger compartment for actuating first water control valve means associated with the tank; first conduit means for directing water from said first water control valve means to water spray ejection means located adjacent to the tire surface; second conduit means for directing water from said first water control valve means to water stream ejection means located adjacent to the brake housings of the wheels; third conduit means for directing water from said first conduit means to water spray ejection means located adjacent the radiator; second valve control means located in the passenger compartment for actuating second water control valve means associated with said second conduit means; fourth conduit means for directing water from said second water control valve means to preheating means associated with the engine exhaust manifold; fifth conduit means for directing water from said preheating means to electrical heating means; sixth conduit means for directing hot water from said electrical heating means to the passenger compartment; and seventh conduit means for directing cold water from said second water control valve means to the passenger compartment.

2. The cooling system of claim 1 wherein: said tire associated water spray ejection means is located adjacent to the front upper quadrant of each tire.

3. The cooling system of claim 2: wherein said tire associated water spray ejection means is located at an angle of 45 degrees to the vertical.

4. The cooling system of claim 1 wherein: said tire and radiator associated water spray ejection means provides an atomized spray of water having droplets with a diameter of about 50 to 100 microns.

5. The cooling system of claim 1 wherein: said brake housing associated water stream ejection means provides a stream of water having a diameter of about 1.5 millimeters.

6. The cooling system of claim 1 further comprising pump means being located in between said water tank and said first water control valve means.

* * * * *